United States Patent [19]
Iwagami et al.

[11] Patent Number: 4,538,057
[45] Date of Patent: Aug. 27, 1985

[54] CASH ACCOUNTING SYSTEM

[75] Inventors: Kenji Iwagami, Sakai; Hachizou Yamamoto, Kyoto, both of Japan

[73] Assignee: Sharp Kabushiki Kaisha, Osaka, Japan

[21] Appl. No.: 505,366

[22] Filed: Jun. 16, 1983

[30] Foreign Application Priority Data

Jun. 18, 1982 [JP] Japan ................................ 57-105982

[51] Int. Cl.[3] ................................................ G06F 15/30
[52] U.S. Cl. ...................................... 235/379; 235/380
[58] Field of Search ................................. 235/379, 380

[56] References Cited

U.S. PATENT DOCUMENTS 4,495,627 1/1985 Nishimura ............................ 235/379

Primary Examiner—Harold I. Pitts
Attorney, Agent, or Firm—Birch, Stewart, Kolasch & Birch

[57] ABSTRACT

This disclosure is directed to an improved cash accounting system which includes a cash register for registering various money transaction information, and a cash dispenser for paying out money in the form of bills and/or coins corresponding to sum of money to be paid out resulting from various transaction registration, with the cash register being electrically couple to the cash dispenser. The cash accounting system is arranged to judge whether or not the cash dispenser corresponds to paying-out of specific money based on length of data fed from the cash dispenser to the cash register.

2 Claims, 10 Drawing Figures

Fig. 4 (a)
Fig. 4 (b)
Fig. 4 (c)
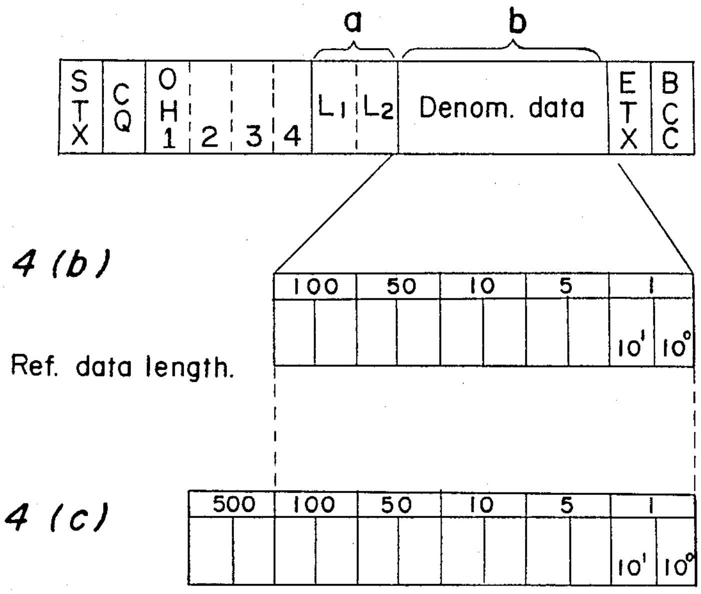
Fig. 5 (a)
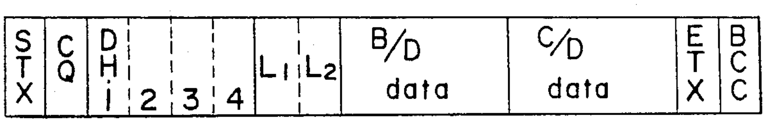
Fig. 5 (b)
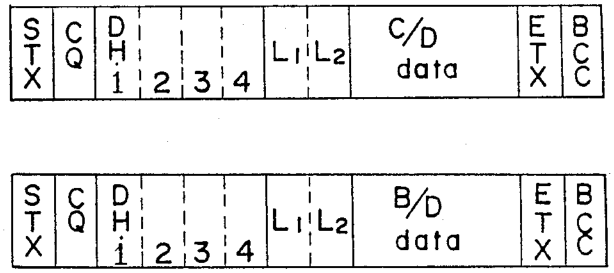

CASH ACCOUNTING SYSTEM

BACKGROUND OF THE INVENTION

The present invention generally relates to a cash accounting system and more particularly, to an improved cash accounting system to be employed, for example, for services at counters in a bank or the like, in which a cash register to be used for registration of transactions is electrically coupled with a cash dispenser for paying out an amount of money such as bills and/or coins required as a result of each transaction.

In the conventional cash accounting systems, it has been required for an operator to confirm whether or not the cash or coin dispenser connected to the cash register can cope with paying out of specific coins, for example, five hundred-yen coins in Japanese currency, according to machine numbers or appearances of the cash dispensers so that the operator sets such information in a setting area of the cash register through utilization of an input means of said cash register, based on the result of the above confirmation.

Accordingly, for effecting the confirmation as described above, the operator is required to preliminarily understand which machine number corresponds to the specific coin to be dealt with, while, for the judgement by the appearance, it has also been necessary for the operator to have a preliminary knowledge about the coin dispenser of each manufacturer, since the construction of the coin dispenser differs according to respective manufacturers, for example, in the number of trays employed, etc., and thus, there has been such a disadvantage as erroneous settings and the like, due to mistakes in the confirmation.

SUMMARY OF THE INVENTION

Accordingly, an essential object of the present invention is to provide an improved cash accounting system which is capable of automatically setting therein, information as to whether or not a cash dispenser connected to a cash register thereof can deal with specific money such as bill and/or coins so as to prevent erroneous settings through mistake in confirmation by an operator, with substantial elimination of disadvantages inherent in the conventional cash accounting systems of this kind.

Another important object of the present invention is to provide a cash accounting system of the above described type which is simple in construction and stable in functioning at high reliability, and can be readily manufactured at low cost.

In accomplishing these and other objects, according to one preferred embodiment of the present invention, there is provided a cash accounting system which includes a cash register for registering various money transaction information, and a cash dispenser for paying out money in the form of bills and/or coins corresponding to the sum of money to be paid out resulting from various transaction registration, with the cash register being electrically coupled to the cash dispenser. The cash accounting system further includes means for judging whether or not the cash dispenser corresponds to paying-out of specific money based on the length of data fed from the cash dispenser to the cash register.

By the arrangement according to the present invention as described above, an improved cash accounting system efficient in operation has been advantageously presented, with substantial elimination of disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 4(*a*) to 4(*c*), and 5(*a*) and 5(*b*) are diagrams respectively showing formats of transfer data.

DETAILED DESCRIPTION OF THE INVENTION

Figure 1:
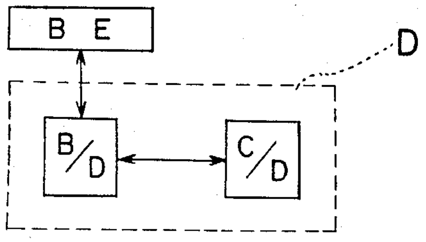
FIG. 1 is a block diagram showing a general construction of a cash accounting system for effecting the present invention.

Before the description of the present invention proceeds, it is to be noted that like parts are designated by like reference numerals throughout the accompanying drawings.

Referring now to the drawings, there is shown in FIG. 1 a block diagram showing a general construction of a cash accounting system for effecting the present invention. In FIG. 1, the cash accounting system includes a cash register BE for registering and processing information of various transactions, a bill discharger B/D connected to the cash register BE for discharging or paying out bills (for example, five hundred-yen notes, one thousand-yen notes, five thousand-yen notes or ten thousand-yen notes in Japanese currency), and a coin discharger C/D further connected to the bill discharger B/D for discharging or paying out coins (for example, one-yen coins, five-yen coins, ten-yen coins, fifty-yen coins and one hundred-yen coins in Japanese currency), with the combination of said bill discharger B/D and said coin discharger C/D constituting a cash dispenser D. The bill discharger B/D is incorporated with a processing means for judgement as to which of the bill discharger B/D and the coin discharger C/D should be used to discharge the designated amount of specific money, based on discharge data received from the cash register BE, and also for effecting data transfer control in the case where judgement is made that the designated amount of specific money should be discharged, for example, through the coin discharger C/D.

Figure 2:
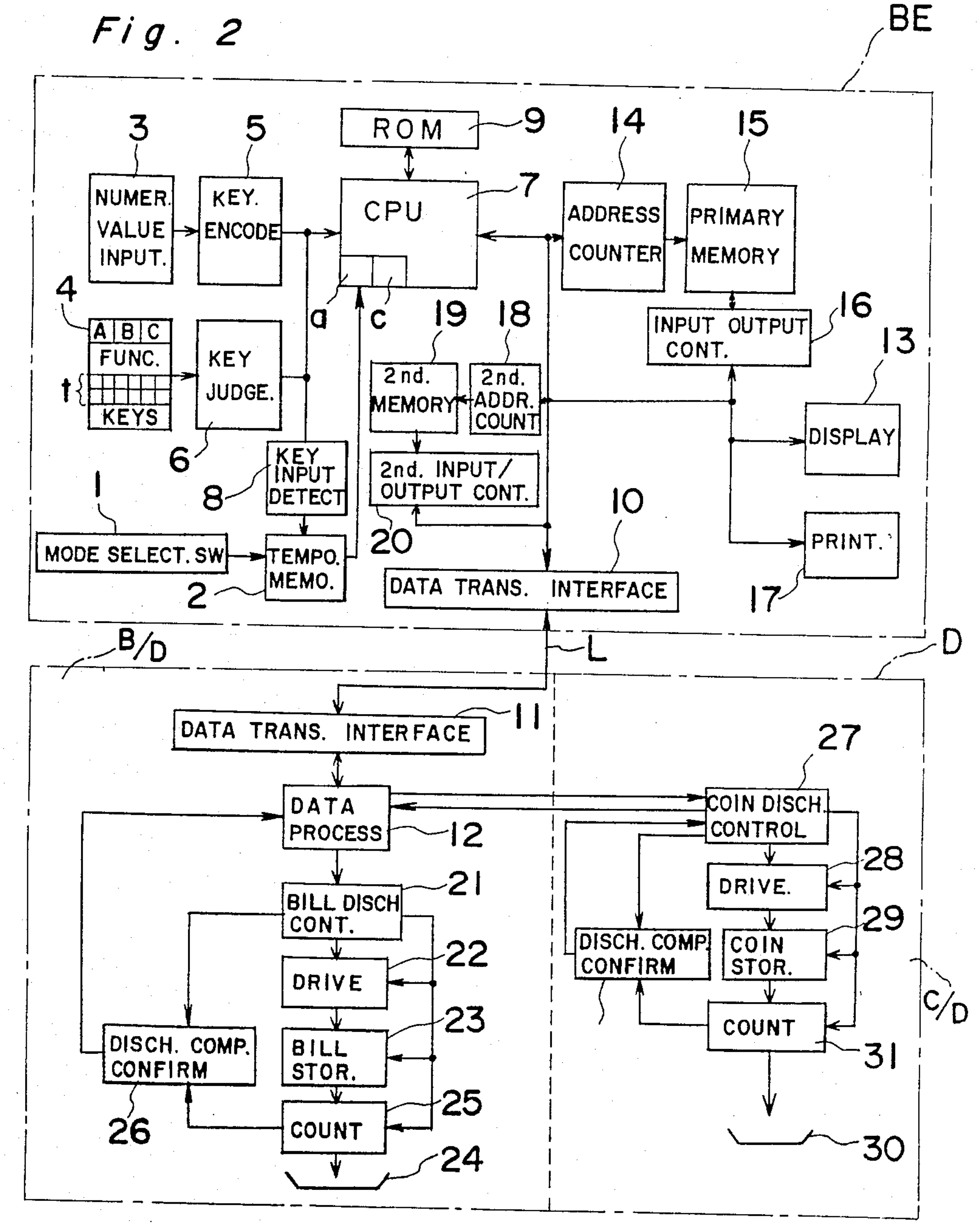
FIG. 2 is a block diagram particularly showing specific constructions of respective devices employed in the arrangement of FIG. 1.

Referring also to FIG. 2 showing specific constructions of the respective devices employed in the arrangement of FIG. 1, the cash register BE is electrically coupled with the cash dispenser D including the bill discharger B/D and the coin discharger C/D, through a line L as described above.

In the arrangement of FIG. 2, the cash register BE includes a mode selector switch 1 connected to a central processing unit (CPU) 7 through a temporary memory means 2, a numerical value input means 3 coupled to the central processing unit 7 through a key encoder 5 and also to the temporary memory means 2 through a key input detecting means 8, a group of function keys 4 including, for example, a specific key A, a pay-out key B, a check key C and a money denomination t, etc., and connected to the central processing unit 7 and the key input detecting means 8 through a key judging means 6, a read only memory (ROM) 9 coupled to the central processing unit 7, a primary memory 15 coupled to the central processing unit 7 through an address counter 14 and also connected to a display means 13 and a printer means 17 through an input/output control means 16, which is further connected to the address counter 14 and also to a secondary input/output control means 20 through a secondary address counter 18 and a secondary memory 19, and a data transfer interface 10 connected to the secondary input/output control means 20, the second address counter 18 and the address counter 14 as shown.

The mode selector switch 1 is arranged to designate functioning mode of the cash register BE to a set mode, a registering mode, etc., and the temporary memory means 2 is adapted to temporarily store mode information designated through actuation of the mode selector switch 1. The central processing unit 7 includes a mode information storing area "a" and a setting and storing area "c" of a flag showing a state of connection of a device corresponding to specific money to be mentioned later, while the read only memory 9 for storing a micro-program which controls a series of functionings of the cash register BE fixedly stores therein a setting processing program, a registration processing program, etc. to be described later.

The data transfer interface 10 is connected through the line L to another data transfer interface 11 at the side of the cash dispenser D for transmittance and reception of various data therebetween.

Meanwhile, in the cash dispenser D in FIG. 2, the bill discharger B/D includes a data processing means 12 connected to the interface 11, and to a counting means 25 through a bill discharge control means 21, a drive means 22 and a bill storage means 23, a money discharge completion confirmation means 26 connected to the bill discharge control means 21 and the counting means 25, and also coupled to the data processing means 12, and a tray 24 for receiving discharged bills.

On the other hand, the coin discharger C/D in the cash dispenser D in FIG. 2 includes a coin discharge control means 27 coupled to the data processing means 12 in the bill discharger B/D and also to a counting means 31 through a drive means 28 and a coin storage means 29, a money discharge completion confirmation means 32 connected to the counting means 31 and the coin discharge control means 27, and a tray 30 for receiving discharged coins.

In the bill discharger B/D ad described above, the drive means 22 is arranged to actuate a bill discharge mechanism of the bill storage means 23 in which bills are stored according to denominations, upon receipt of the signal from the bill discharge control means 21, while the counting means 25 is adapted to count the number of discharged bills and to stop the discharge function when the bills have reached the designated number. The money discharge completion confirmation means 26 is intended to judge completion of discharge function for the bills of all the designated denominations and apply discharge completion signal to the data processing means 12.

Meanwhile, in the coin discharger C/D in the above cash dispenser D, the drive means 28 is arranged to actuate a coin discharge mechanism of the coin discharge means 29 in which coins are stored according to denominations upon receipt of the signal from the coin discharge control means 27. The counting means 31 is adapted to count the number of discharged coins and stop the discharge function when the coins have reached the designated number, while the money discharge completion confirmation means 32 is arranged to judge completion of discharge function for the coins of all the designated denominations and feed discharge completion signal to the coin discharge control means 27.

Subsequently, functioning of the cash accounting system according to the present invention as described so far will be explained hereinbelow with reference to functioning flow charts shown in FIGS. 3(*a*), 3(*b*) and 3(*c*), in which FIG. 3(*a*) represents the functioning for the setting mode, while FIGS. 3(*b*) and 3(*c*) (FIG. 3(*b*) continues on FIG. 3(*c*)) illustrates the functioning for the registration and pay-out mode.

Figure 3A:
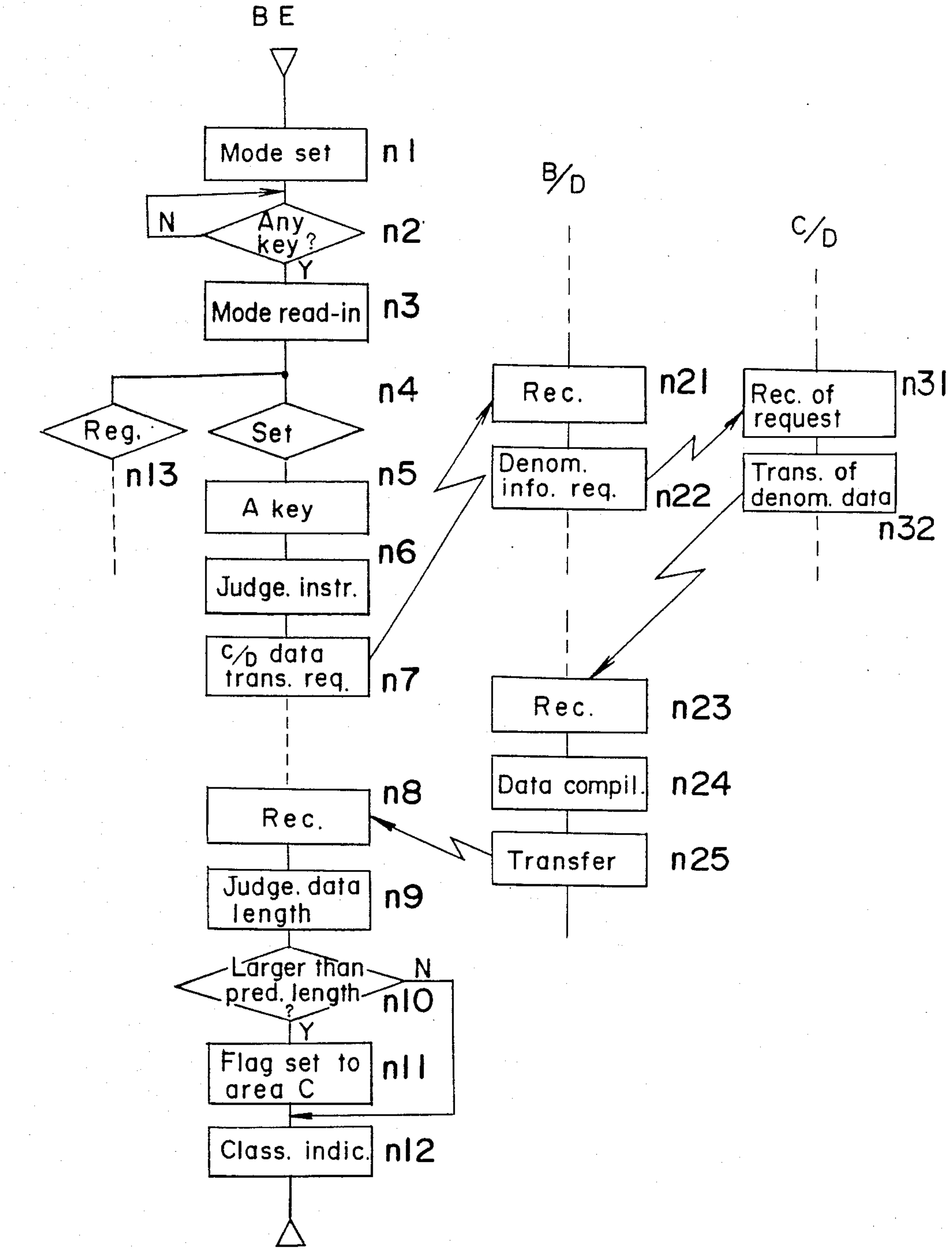
FIGS. 3(*a*), 3(*b*) and 3(*c*) are flow charts explanatory of functioning of the arrangement of FIGS. 1 and 2.
Figure 3:
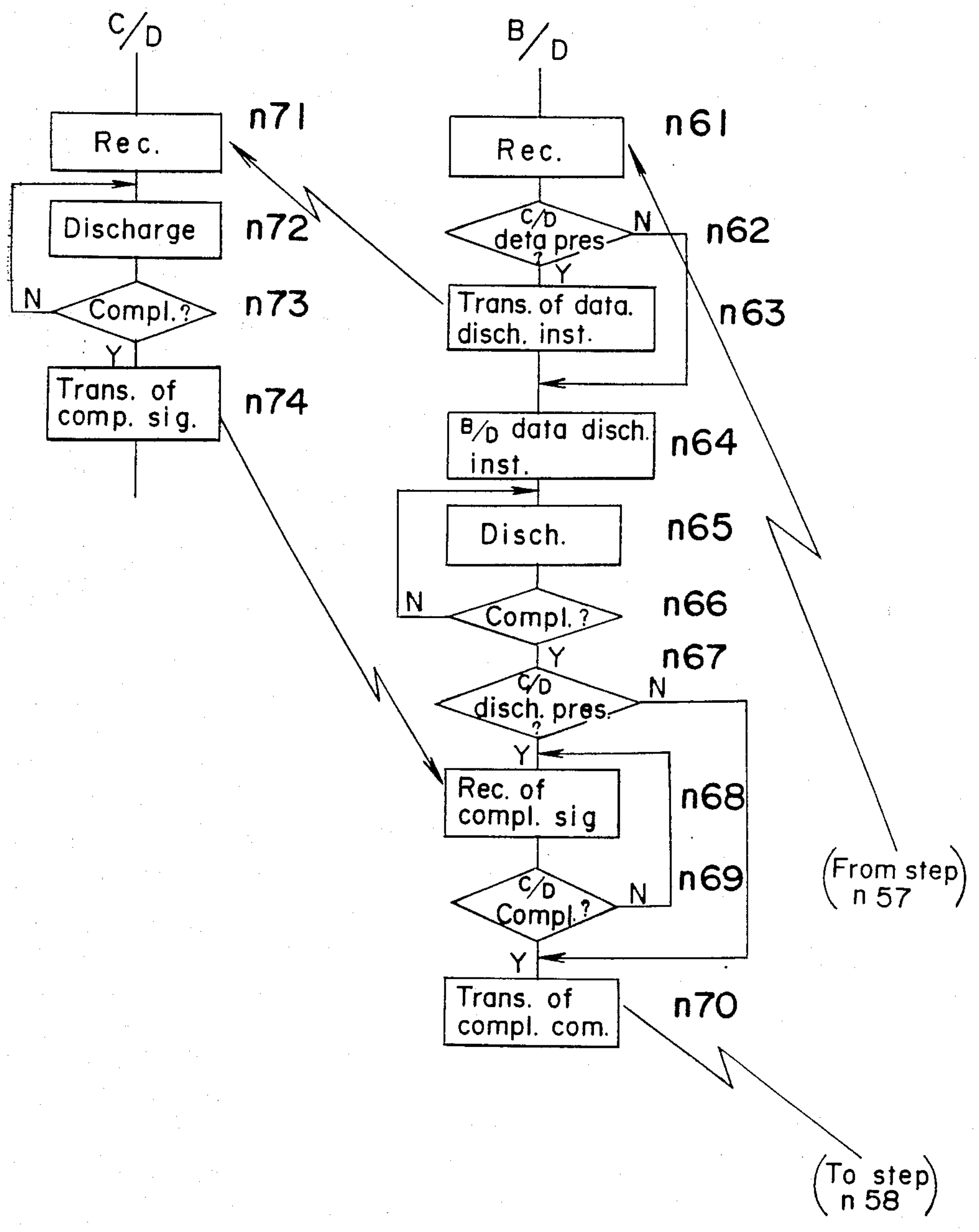
Figure 3C:
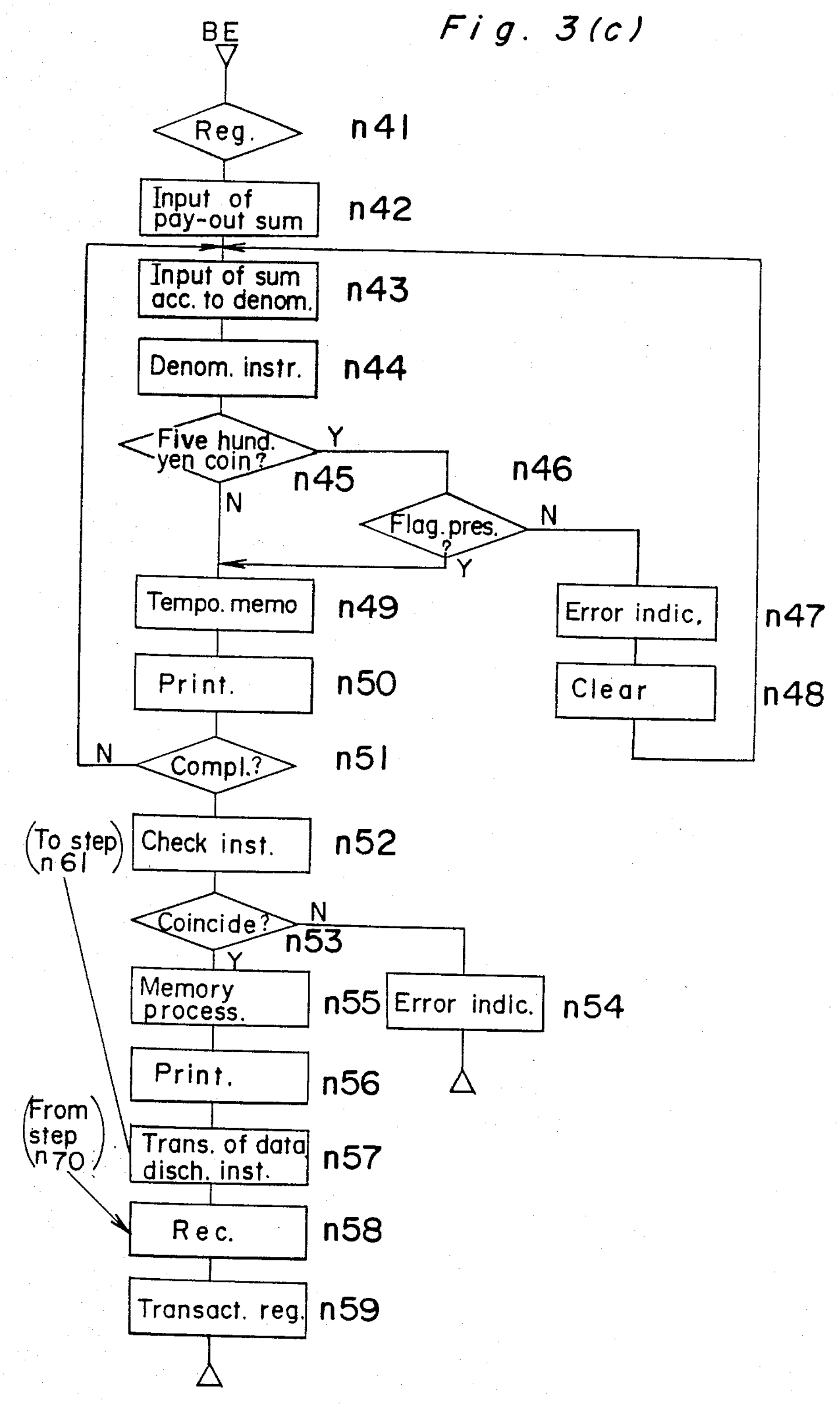

(1) Setting as to whether or not the coin discharger corresponds to specific coins (FIG. 3(*a*) and FIGS. 4(*a*), 4(*b*) and 4(*c*))

In order to judge as to whether or not the coin discharger C/D connected to the cash register BE through the bill discharger B/D is set to correspond so as to allow discharge of specific coins (for example, five hundred-yen coins in Japanese currency), the operator first sets the mode selector switch 1 of the cash register BE to the setting mode for temporarily storing the set mode information in the temporary memory means 2 (step n1). Subsequently, when the operator depresses the key of either the numerical value input means 3 or the group of the function keys 4, the key signal produced thereby is applied to the central processing unit 7 through either the key encoder 5 or the key judging means 6, and also to the key input detecting means 8. Upon detection of the key input by the key input detecting means 8 at a step n2, the set mode information previously applied and stored in the temporary memory means 2 is applied to an area "a" of the central processing unit 7 to be stored therein, and the cash register BE is set to the setting mode at a step n3. Upon selection of this mode, the central processing unit 7 selects the set processing program preliminarily stored in the read only memory 9 so as to process data subsequently applied thereto based on the above set processing program.

With the cash register BE set as described above, the operator depresses the specific key A (step n5) of the group of the function keys 4 and gives and instruction to the central processing unit 7 through the key judging means 6 for judgement as to whether or not the coin discharged C/D corresponds to the specific coins (step n6).

Upon receipt of the above judgement instruction, thc central processing unit 7 requests transfer of the data of the coin discharger C/D with respect to the bill discharger B/D through the data transfer interface 10 (step n7). The data processing means 12 for the bill discharger B/D, which has received the transfer request of data of the coin discharger C/D through the data transfer interface 11 (step n21), requests the transfer of information for the denomination of the discharge money with respect to the coin discharger C/D (step n22). Upon receipt of the above transfer request of the discharge money denomination information (step n31), the coin discharger C/D transfers the information of money denomination (for example, for one-yen, five-yen, ten-yen, fifty-yen, one hundred-yen, etc.) which can be discharged by said coin discharger C/D itself, to the bill discharger B/D (step n32).

The data processing means 12 which has received the above money denomination information (step n23), compiles data as shown in FIGS. 4(*a*), 4(*b*) and 4(*c*) (step n24), based on said denomination information, and transfers the data thus compiled, to the cash register BE through the interface 11 (step n25). The above compiled data include a denomination data area "b" each of two digits for the respective denomination so as to memorize, for example, five denominations for one-yen, five-yen, ten-yen, fifty-yen, and one hundred-yen, with data length thereof being stored in a denomination data length area "a" in the form of $5\times2=10$, and such data system as shown in FIG. 4(*b*) is regarded as the standard system. In the above area "a", standard data length "10" is stored without fail, and if it is so arranged that the system can cope with, for example, five hundred-yen coins besides the five denominations described earlier, the data processing means 12 compiles data as in FIG. 4(*c*) so as to store "12" in the area "a". It should be noted that in FIG. 4(*a*), STX represents start text, ETX denotes end text, CQ shows codes according to kinds of respective appliances, DH1 to DH4 show data of state of the respective appliances, $L_1$ and $L_2$ represent money denomination data lengths, and BCC denotes parity check data area.

Upon receipt of data compiled by the data processing means 12 of the bill discharger B/D and transferred in the manner as described above, the central processing unit 7 judges whether or not the data length stored in the area "a" of the above transferred data is longer than the standard data length "10" (steps n8 and n9), and if the present transferred data length is longer than the standard data length (step n10), erects a flag in the area "c" of said central processing unit 7 for indicating that the coin discharger B/D can cope with the specific coins (step n11), with a simultaneous indication of the fact by the display means 13 (step n12). Meanwhile, if the data length is equal to the standard data length, the fact is displayed on the display means 13.

The functionings for the setting mode are effected in the manner as described so far.

Subsequently, specific functionings for effecting the registering operation through employment of the cash accounting system of the present invention will be explained in detail hereinbelow with reference to the functioning flow chart in FIGS. 3(*b*) and 3(*c*).

(2) Registering operation

In the first place, the operator sets the cash register to the registration mode (step n41) in the similar manner as described previously. In the above state, on the assumption that pay-out registration is effected, the operator first inputs the sum to be paid out, into the central processing unit 7 by the numerical value input means 3 through the key encoder 5, and subsequently depresses the pay-out key B of the group of function keys 4 for instruction that the money sum information previously applied to the central processing unit 7 through the key judging means 6 is of the sum to be paid out (step n42). Upon receipt of the above instruction, the central processing unit 7 causes the information to be stored in the predetermined area of the primary memory 15 designated by the address counter 14, through the input/output control means 16, and also, prints out the money amount information on a slip or the like by the printer means 17, with a simultaneous display thereof by the display means 13.

Successively, the operator inputs the classification according to denominations of the above pay-out amount, into the central processing unit 7 (steps n43 and n44), through utilization of the input means 3 and the money denomination keys t of the group of function keys 4. In the above case, the central processing unit 7 judges whether or not the dencmination of money input thereto is of the specific money (for example, five hundred-yen coin) (step n45), and if it is of the specific money, checks for presence or absence of the flag in the area "c" (step n46), and thus, if no flag is set in the area "c", informs the operator, through the display means 13, that the discharge of the specific money (for example, five hundred-yen coin) can not be effected by this system (step n47).

Upon observation of the above information, the operator clears the contents (step n48), and again designates money denomination amount. Meanwhile, if the flag is set in the area "c", the specific money data are stored in the predetermined area of the primary memory 15 (step n49), and also printed out onto a slip and the like by the printer means 17 (step n50). On the other hand, in the case where the input money denomination is not of the specific money, such money denomination amount information is stored in the memory 15 in the similar manner as above and simultaneously printed onto a slip and the like.

Upon completion of input of all the money denomination amount information (step n51) in the above described manner, the operator depresses the check key C of the group of function keys 4 to give a check instruction to the central processing unit 7 (step n52) for judgement as to whether or not the pay-out amount previously input and the sum of the m ®ney denomination and amount now input are in agreement with each other.

The central processing unit 7 which has received the above check instruction, carries out the checking (step n53), and if both of the amounts are not in agreement, effects the error indication by the display means 13 (step n54). Meanwhile, if both of the amounts are in agreement, the central processing unit 7 causes these input data to be stored from the primary memory 15 into the secondary memory 19 designated by the secondary address counter 18 through the secondary input/output control means 20 (step n55), and simultaneously, prints out on a slip and the like, the data that both of the amounts are in agreement (step n56).

Furthermore, the central processing unit 7 successively compiles the pay-out data into data in the formats as shown in FIGS. 5(*a*) and 5(*b*for transfer thereof towards the bill discharger B/D through the interface 10, and also, gives instruction for discharge of money for the respective denominations (step n57).

Upon receipt of the above discharge instruction, the data processing means 12 (step n61) judges whether or not the coin discharge data are present in the transferred data (step n62), and, in the presence of the coin discharge data, applies the discharge instruction (step n63) together with the coin discharger C/D. Meanwhile, in the absence of discharge data at the coin discharger C/D, the data processing means 12 emits discharge instruction based on the bill discharge data (step n64) to actuate the bill discharge control means 21, and drives the drive means 22 so as to discharge bills of respective denominations stored in the storage means 23 onto the tray 24 by the designated number (step n65).

In the above case, the number of bills thus discharged is counted by the counting means 25, and the discharge completion confirmation means 26 judges whether or not the above counting data and the designated number of discharged bills are in agreement.

Upon completion of discharge of the bills in the above described manner (step n66), the data processing means 12 ensures whether or not the discharge of coins is present (step n67), and if there is no discharge of coins, transfers the completion command (step n70) with respect to the cash register BE. Meanwhile, in the presence of discharge of coins, the data processing means 12 transfers the completion command with respect to the cash register BE, upon receipt of the discharge completion signal from the coin discharger C/D (steps n68 and n69).

The central processing unit 7 which has received the above completion command (step n58) completes the registration of the transaction (step n59). Meanwhile, the coin discharger C/D which has received the above coin discharge instruction (step n71), drives the drive means 28 under the control by the discharge control means 27 so as to discharge the coins stored in the storage means 29 onto the tray 30 (step n72). The coins thus discharged are counted by the counting means 31 for confirmation whether or not the number thereof coincides with the number for discharge designated by the discharge confirmation means 32.

When the discharge of all the coins has been completed as described so far (step n73), the coin discharger C/D transfers the discharge completion signal with respect to the bill discharger C/D (step n74).

In the manner as explained in the foregoing, a series of functioning for the registration and pay-out are effected.

As is clear from the foregoing description, according to the present invention, since setting of the data in the money dischargers, as to whether or not said money dischargers connected to the cash register are capable of paying out specific bills or coins, may be automatically effected, not only erroneous settings due to mistake in confirmation by the operator can be advantageously prevented, but the work required for the operator may be appreciably reduced, and thus, a cash accounting system extremely useful for practical applications has been advantageously presented.

Although the present invention has been fully described by way of example with reference to the accompanying drawings, it is to be noted here that various changes and modification will be apparent to those skilled in the art. Therefore, unless otherwise such changes and modifications depart from the scope of the present invention, they should be construed as included therein.

What is claimed is:

1. A cash accounting system which comprises a cash register (BE) for registering various money transaction information, and a cash dispenser (D) for paying out money in the form of bills and/or coins corresponding to sum of money to be paid out resulting from various transaction registration, said cash register (BE) being electrically coupled to said cash dispenser (D), the improvement comprising means for judging whether or not the cash dispenser (D) corresponds to paying-out of specific money, based on length of data fed from said cash dispenser (D) to said cash register (BE).

2. A cash accounting system as claimed in claim 1, wherein said cash dispenser (D) includes a bill discharge (B/D) for discharging specific bills therefrom connected to said cash register (BE), and a coin discharger (C/D) for discharging specific coins connected to said bill discharger (B/D).

* * * * *